H. C. Markham,
Strainer.
No. 112,364. Patented Mar. 7, 1871.
General View showing Exterior & Interior Strainer over Sink &c.
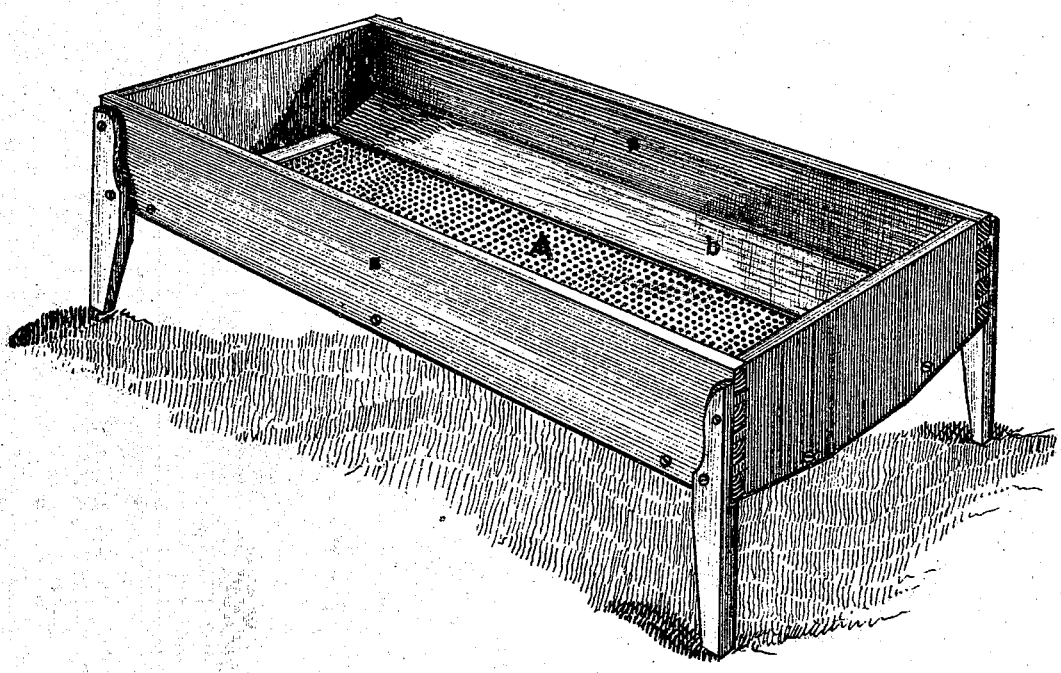
Transverse Section.
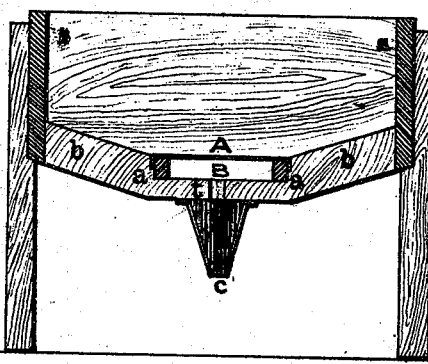
Witnesses.            Inventor.
                      Homer C. Markham

UNITED STATES PATENT OFFICE.

HOMER C. MARKHAM, OF COLLINSVILLE, NEW YORK.

IMPROVEMENT IN CHEESE-CURD SINKS.

Specification forming part of Letters Patent No. 112,364, dated March 7, 1871.

Be it known that I, HOMER C. MARKHAM, of Collinsville, Lewis county, New York, have invented a new and useful Improvement in Cheese-Curd Sinks; and I do hereby declare that the following is a clear, exact, and full description of said improvement and its operation, reference being had to the accompanying drawing, making part of these specifications, in which the upper drawing is a perspective, showing an exterior and interior view of the improved sink, while the lower sketch is a sectional view of the sink crosswise, like letters referring to similar parts.

S S is the sink, constructed with sides and ends as in ordinary use. The bottom $b$, instead of being level, as commonly used, is beveled from the sides toward the center for about one-third of the width on each side. The portion forming the longitudinal central third is sunken from three-fourths to one inch in depth, thus forming a shallow pit, B, nearly the entire length of the sink, with the exception of some three or four inches at each end. In the bottom of this pit is an opening, $t$, near one end, through which liquids from the sink can run off into the funnel C.

$d\,d$ is a light frame, in thickness nearly equal to the depth of the sunken portion, which is made to fit into the pit B, in the bottom of the sink, and over the top of this frame is permanently fastened the metallic strainer A, being turned down at the sides and ends of the frame $d\,d$. This strainer may be of wire-cloth, but preferably of perforated sheet metal, as being more durable and more readily kept clean. This frame, to which the strainer is attached, may be easily removed for the purpose of cleaning itself and the pit B.

In long sinks the strainer-frame may be made in two or more sections for convenience of handling.

In use its operation is as follows: The milk in the cheese-vats having been coagulated, the curd properly manipulated, cooked, &c., the mass is now dipped into the sink S S, in which the whey is at once allowed to drain off through the perforations in the strainer A into the pit B, from which it is conducted through the aperture $t$ into the funnel C. From this it is conveyed by a suitable spout to the whey-vats. During the process of drainage the curd is thoroughly worked over, cooled, salted, and made ready for the press.

In the common sink as heretofore used there was a large wooden rack covering the entire bottom of the sink, and over this, and extending up over and hanging down around the outsides, was thrown a large piece of hemp, linen, or cotton strainer-cloth, and onto this cloth, supported by the rack, the curd was thrown and worked over, salted, &c.

It will be seen that in my improvement the large and cumbrous rack, so difficult to keep clean and sweet, is done away with, while the expense of cloth strainers, which are constantly being subject to severe wear and tear, is unnecessary, besides which the facility with which the curd can be manipulated on the smooth bottom is far pleasanter to the hands than the old method.

Having thus described the construction and operation of my invention, what I claim, and desire to secure by Letters Patent, is—

A cheese-curd sink having its bottom beveled toward the center, and provided with the longitudinal channel B, the perforated metallic or wire-gauze strainer A, the aperture $t$, and funnel C, all constructed and arranged as described, and for the purpose set forth.

HOMER C. MARKHAM.

Witnesses:
H. J. CORNISH,
RALPH RICHMOND.